3,463,554
WARNING DEVICE
Richard C. Bueler, Glendale, Mo., assignor to Wagner Electric Corporation, Newark, N.J., a corporation of Delaware
Filed Aug. 15, 1968, Ser. No. 752,879
Int. Cl. B60t 17/22
U.S. Cl. 303—6    4 Claims

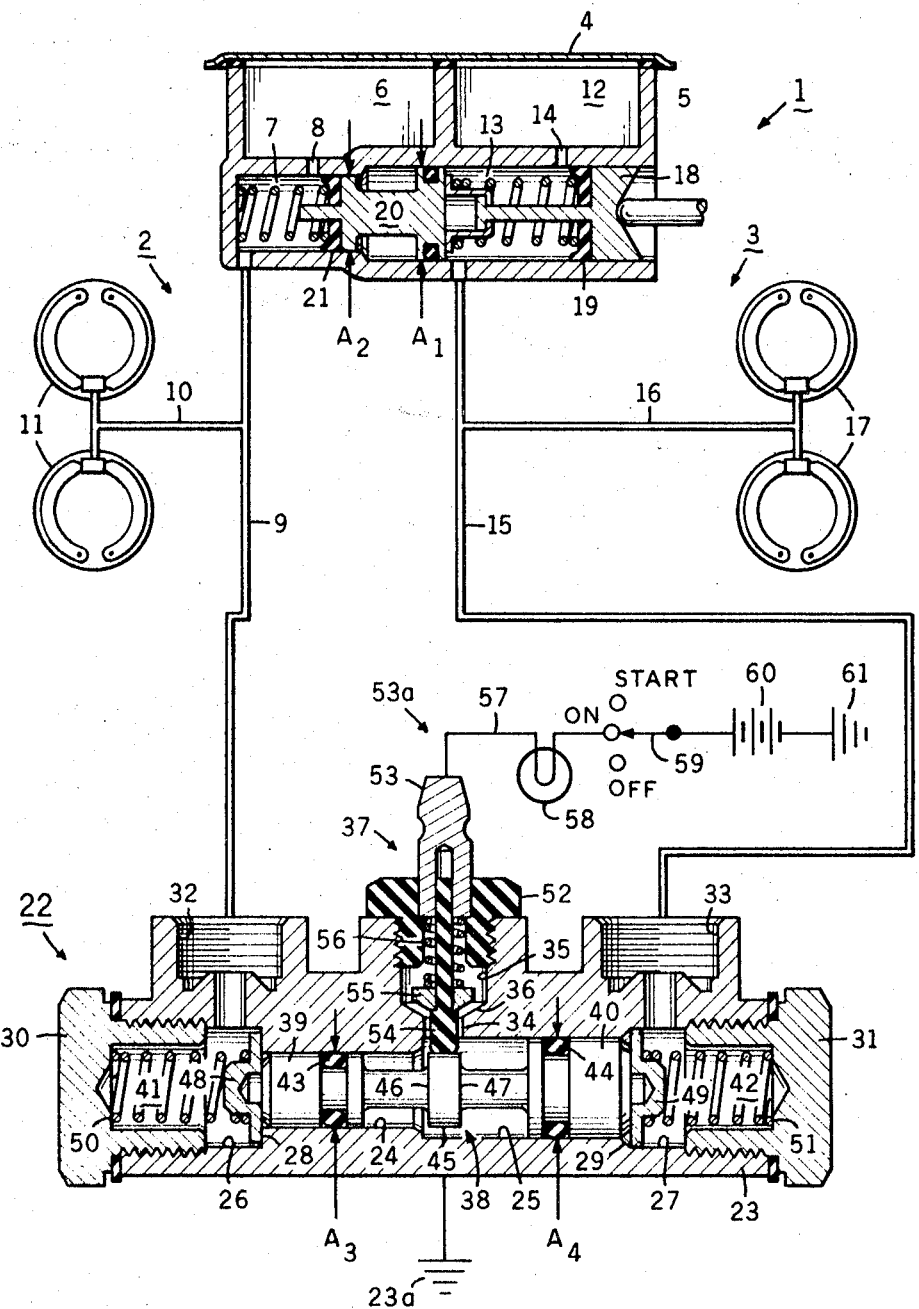

ABSTRACT OF THE DISCLOSURE

A split braking system having a split master cylinder for establishing proportional fluid pressures to energize a pair of brake sets and a warning device for comparing the magnitudes of the established proportional fluid pressures and indicating a fluid pressure failure in said system.

---

This invention pertains to split braking systems and in particular to those having fluid pressure failure indicating means for comparing the magnitudes of the separate fluid pressures established in said split braking systems.

In the past, split braking systems were provided with split or tandem master cylinders which generated separate and substantially equal fluid pressures to energize separate axle sets of vehicle brakes, and various warning devices were employed to compare the magnitudes of the substantially equal generated fluid pressures and warn the operator upon the occurrence of a predetermined differential therebetween. When a split master cylinder which generated separate and proportional fluid pressures was utilized in such past split braking systems, a disadvantageous or undesirable feature thereof was that a system failure would always be indicated since the warning device could not compare with the proportional fluid pressures generated in the system.

The principal object of the present invention is to provide a split braking system incorporating such warning device which overcomes the aforementioned disadvantageous or undesirable feature of such past split braking systems, and this, as well as other objects and advantageous features of the present invention, will become apparent from the following description and drawing which form a part of the specification.

Briefly, the present invention comprises a split braking system having a split master cylinder therein for generating separate proportional fluid pressures to energize separate sets of vehicle brakes, and a warning device including movable means having opposed differential areas for comparing the proportional magnitudes of the generated fluid pressures.

In the drawing, wherein like numerals refer to like parts wherever they occur, a schematic diagram of a split braking system having a warning device therein in cross-section is shown embodying the present invention.

Referring now to the drawing in detail, a split braking system 1 is provided with separate branches, indicated generally at 2, 3, and a fluid pressure generating device, such as a split or tandem master cylinder 4, is connected with said branches 2, 3, respectively; however, since the construction and operation of such split master cylinders are so well known to the art, only a superficial description thereof, as set forth hereinafter, is deemed necessary to adequately describe the system 1. In the branch 2, the split master cylinder 4 is provided with a housing 5 having a pressure fluid reservoir or sump 6 therein connected in pressure fluid communication with a fluid pressure generating chamber 7 by a compensation port 8, and a conduit 9 and branch conduit 10 connect said chamber in pressure fluid communication with an axle set of vehicle brakes 11. In the branch 3, the split master cylinder 4 is provided with a separate pressure fluid reservoir or sump 12 in the housing 5 connected in pressure fluid communication with a separate fluid pressure generating chamber 13 by another compensation port 14, and another conduit 15 and branch conduit 16 connect said separate chamber in pressure fluid communication with another axle set of vehicle brakes 17. Fluid pressure generating means, such as a manually driven piston 18 and seal 19, is movable in the housing 5 past the compensation port 14 to isolate the reservoir 12 from the chamber 13 and generate fluid pressure $P_1$ in said chamber which flows through the conduits 15, 16 to energize the brakes 17, and other fluid pressure generating means, such as a floating piston 20 and seal 21, is movable in said housing between the chambers 7, 13, said floating piston 20 being movable in response to the generated fluid pressure $P_1$ in the chamber 13 past the compensating port 8 to isolate the reservoir 6 from the chamber 7 and generate fluid pressure $P_2$ in the chamber 7 which flows through the conduits 9, 10 to energize the brakes 11. It should be noted that the floating piston 20 is provided with opposed effective areas $A_1$, $A_2$ which are in a predetermined ratio, and the larger area $A_1$ is subjected to the generated fluid pressure $P_1$ in the chamber 13 for moving said floating piston to generate the fluid pressure $P_2$ in the chamber 7. Since the area $A_2$ is predeterminately smaller than the area $A_1$, the fluid pressure $P_2$ generated in the chamber 7 will be greater than the generated fluid pressure $P_1$ in the chamber 13 and in a ratio therewith substantially inversely proportional to the predetermined ratio between the areas $A_1$, $A_2$.

A warning device or valve 22 is shown connected in the system 1 between the branches 2, 3 thereof. The warning device 22 is provided with a housing 23 adapted for electrical connection to ground at 23a having centrally located stepped bores 24, 25 therein respectively connecting with opposed counterbores 26, 27, and opposed shoulders 28, 29 are provided in said housing adjacent to the juncture of the smaller stepped bore 24 with said counterbore 26 and the larger stepped bore 25 with said counterbore 27. The counterbores 26, 27 are closed by closure members 30, 31 threadedly received therein, and ports 32, 33 which receive the conduits 9, 15 are provided in the housing 23 intersecting said counterbores 26, 27 adjacent to the shoulders 28, 29, respectively. A cross-bore and counterbore 34, 35 having a shoulder or contact seat 36 therebetween is also provided in the housing 23, said cross-bore intersecting with the larger stepped bore 25 adjacent to its juncture with the smaller stepped bore 24 and said cross-counterbore having a switch, indicated generally at 37 and discussed hereinafter, threadedly received therein.

A reciprocal switch actuating member or stepped piston, indicated generally at 38, is shown in its normal operating or centered position in the stepped bores 24, 25 being slidably received therein, and spaced opposed annular flanges or end portions 39, 40 are provided on said stepped piston defining with the housing 23 opposed fluid pressure chambers 41, 42 connected in pressure fluid communication with the ports 32, 33, respectively. Seals 43, 44 are carried in the flanges 39, 40 in sealing engagement with the stepped bores 24, 25, and it should be noted that the sealing engagement of said seals with said stepped bores define opposed differentianl effective areas $A_3$, $A_4$ which are subjected to the respective generated fluid pressures $P_1$, $P_2$ applied to the ports 33, 32, respectively. The area $A_4$ is greater than the area $A_3$ and in a ratio therewith substantially equal to the predetermined ratio between the areas $A_1$, $A_2$ of the floating piston 20 in the split master cylinder 4. The piston 38 is provided with a central switch positioning land 45 between the opposed flanges 39, 40 which is positioned beneath the housing cross-bore 34 when said piston is in its centered or normal operating position, as shown, and annular switch locking shoulders 46, 47 are provided on opposite sides of said land. Retainers or centering abutments 48, 49 are normally urged into abutting engagement with the housing shoulders 28, 29 and piston flanges 39, 40 by centering or return springs 50, 51 interposed between said retainers and the closure members 30, 31 to impede leftward and rightward movement of the piston 37 from its centered position toward opposed leftward and rightward translated or displaced positions, respectively.

The electrical switch 37, as mentioned hereinbefore, includes a closure or plug member 52 of suitable insulating material which is threadedly received in the housing cross-counterbore 35, and a metal termianl 53 is provided through said plug member having an exterior end for connection in an electrical driver warning circuit 53a, as discussed hereinafter. A switch operating member 54 of suitable insulating material has a lower or follower end slidably and guidably received in the housing cross-bore 34, and an electrical contact 55 is carried on said switch operating member for electrical contact or engagement with the housing shoulder or contact seat 36. A spring 56 having a current carrying capacity is conductively biased between the interior end of the switch terminal 53 and the switch contact 55 urging the switch operating member follower end 54 into abutting or positioning engagement with the piston land 45, said contact being normally spaced from the housing shoulder in its circuit interrupting position when said follower end is engaged with said piston land.

To complete the description of the system 1, the electrical warning circuit 53a includes a lead 57 connecting the external end of the switch terminal 53 to one side of a dash-mounted warning lamp 58, and the other side of said lamp is connected through a vehicle ignition switch, indicated diagrammatically at 59, to one side of the vehicle battery 60 which is connected to ground at 61.

In the operation with the component parts of the system 1 positioned as shown in the drawing, the manual movement of the piston 18 in the split master cylinder 4 generates the fluid pressure $P_1$ in the chamber 13 acting on the area $A_1$ of the floating piston 20 to move said floating piston leftwardly and generate the proportional fluid pressure $P_2$ in the chamber 7 acting on the area $A_2$, and the separate proportional fluid presures $P_2$, $P_1$ flow from chambers 7, 13 through conduits 9, 10 and 15, 16 to actuate brakes 11 and 12, respectively, as mentioned hereinbefore. The fluid pressures $P_2$, $P_1$ also flow from conduits 9, 15 through the ports 32, 33 of the warning device 22 into the chambers 41, 42 thereof acting on the areas $A_3$, $A_4$ of the stepped piston 38, respectively. Since the areas $A_1$, $A_2$ and the areas $A_4$, $A_3$ have previously been defined as being in substantially the same predetermined ratio and since the generated fluid pressures $P_1$, $P_2$ acting on areas $A_1$, $A_4$ and $A_2$, $A_3$ have previously been defined as being in a ratio substantially inversely proportional to the predetermined ratio of areas $A_1$, $A_2$ and $A_3$, $A_4$, the smaller fluid pressure $P_1$ acting on the larger area $A_4$ and the larger fluid pressure $P_2$ acting on the smaller are $A_3$ establishing substantially equal and opposite forces $P_1$, $A_4$ and $P_2$, $A_3$ across the stepped piston 38; therefore, since the forces $P_1$, $A_4$ and $P_2$, $A_3$ are substantially self-cancelling, the stepped piston 38 is relatively unaffected by the proportional magnitudes of the generated fluid pressures $P_1$, $P_2$ and will remain substantially in its centered position.

In the event of a leak or the like in the branch 2, the magnitude of the fluid presusre $P_2$ is, of course, reduced, and the force $P_2$, $A_3$ acting on the stepped piston 38 is correspondingly reduced; therefore, the opposing force $P_1$, $A_4$ acting on said stepped piston will, of course, overcome the reduced force $P_2$, $A_3$ acting thereon and displace said stepped piston leftwardly in the stepped bores 24, 25 against the centering spring 50 toward a leftward displaced or translated position engaging the retainer 48 with the closure member 30.

In the event of a leak or the like in the branch 3, the magnitude of the fluid pressure $P_1$ is, of course, reduced, and the manually operated piston 18 of the split master cylinder 4 is moved into driving engagement with the floating piston 20 to effect the generation of the fluid presure $P_2$. The reduction of the magnitude of the fluid pressure $P_1$ effects a corresponding reduction of the force $P_1$, $A_4$ acting on the stepped piston 38, and the opposing force $P_2$, $A_3$ acting on the stepped piston 38 will, of course, overcome the reduced force $P_1$, $A_4$ acting thereon and displace said stepped piston rightwardly against the centering spring 51 toward a rightward displaced or translated position engaging the retainer 49 with the closure member 31.

When the stepped piston 38 is displaced from its normal operating or centered position into its leftward or rightward dislaced position, as described above, the land 45 on said stepped piston is, of course, concertedly moved therewith from beneath the housing cross-bore 34 and disengaged from the switch follower end 54, and the force of the switch spring 56 drives said follower end downwardly toward a position for locking engagement with either the locking shoulder 46 or 47 to positively maintain said stepped piston in its leftward or rightward displaced position, respectively, and also moves the switch contact 55 into electrical engagement with the housing contact seat 36 to complete the electrical circuit 53a. With the contact 55 engaging its seat 36, current flows from the batery 60 through the ignition switch 59, the lamp 58, the terminal 53, the switch spring 56 and said contact to the grounded housing 23 to thereby energize said lamp indicating to the vehicle operator a fluid pressure failure in one of the system branches 2, 3. The locking engagement between the switch follower end 54 and the locking shoulders 46 or 47 prevents the return of the stepped piston to its centered position, and only upon the manual removal of the switch 37 from the housing counterbore 35 to disengage the follower end 54 from the locking shoulder 46 or 47 will the compressive force of the centering spring 50 or 51 be effective to return the stepped piston 18 to its centered position.

The embodiments of the invention in which an exclusive property or privilege is claimed are defined as follows:

1. In a fluid pressure system comprising a pair of system branches, a pair of fluid pressure responsive motors respectively connected in said branches, means connected in said branches for generating separate fluid pressures therein to energize said motors, one of the generated fluid pressures being greater than and in a predetermined ratio with the other of the generated fluid pressures, and other means connected in said branches including means for comparing the magnitudes of the one and other generated fluid pressures and having opposed differential areas in a ratio substantially equal to the predetermined ratio, the smaller and larger of said areas being respectively subjected to the one and other generated fluid pressures, said included means being movable from a normal operating position toward opposed translated positions upon the occurrence of a force differential in excess of a predetermined value between the one and other generated fluid pressures respectively acting on said smaller and larger areas, and switch means responsive to movement of said included means toward one of its opposed translated positions for indicating the failure of one of said one and other fluid pressures in one of said branches.

2. In a split braking system comprising a pair of brake sets, a split master cylinder including a pair of fluid pressure generating chambers respectively connected with said brake sets, and a pair of movable piston means for generating separate fluid pressures in said chambers and energizing said brake sets, one of the generated fluid pressures being greater than and in a predetermined ratio with the other of the generated fluid pressures, and a warning device connected with said chambers including other movable means for comparing the magnitudes of the one and other generated fluid pressures and having opposed differential areas in a ratio substantially the same as the predetermined ratio, the smaller of said areas being subjected to the one generated fluid pressure and the larger of said areas being subjected to the other generated fluid pressure, said other movable means being movable from a normal operating position toward opposed translated positions upon the occurrence of a force differential in excess of a predetermined value between the one generated fluid pressure acting on said smaller area and the other generated fluid pressure acting on said larger area, and switch means responsive to movement of said other movable means toward one of its opposed translated positions for indicating a fluid pressure failure in said braking system.

3. In the split braking system according to claim 2, comprising other opposed differential areas on one of said piston means in a ratio substantially equal to that of said first named opposed differential areas, the smaller and larger of said other opposed differential areas being respectively subjected to the one and other generated fluid pressures.

4. In the split braking system according to claim 2, comprising a pair of stepped bores in said warning device, said other movable means including a stepped piston having opposed small and large end portions respectively slidable in said stepped bores and defining said smaller and larger areas subjected to the one and other fluid pressures, respectively.

References Cited

UNITED STATES PATENTS

| | | | |
|---|---|---|---|
| 3,171,916 | 3/1965 | Solski et al. | 200—82 |
| 3,394,401 | 7/1968 | Roberts. | |
| 3,421,321 | 1/1969 | Lewis | 60—54.5 |

MILTON BUCHLER, Primary Examiner

JOHN J. McLAUGHLIN, JR., Assistant Examiner

U.S. Cl. X.R.

60—54.5; 92—5; 188—151; 200—82; 303—84